US007893301B2

(12) United States Patent
Ding et al.

(10) Patent No.: US 7,893,301 B2
(45) Date of Patent: Feb. 22, 2011

(54) METHOD OF PREPARING POLYMETHYLENE-POLYPHENYL-POLYAMINE

(75) Inventors: Jiansheng Ding, Yantai (CN); Jianfeng Chen, Beijing (CN); Hongke Zhang, Yantai (CN); Haikui Zou, Beijing (CN); Weiqi Hua, Yantai (CN); Pengyuan Zhang, Beijing (CN); Shuchang Sun, Yantai (CN); Guangwen Chu, Beijing (CN); Limin Xu, Beijing (CN)

(73) Assignees: Ningbo Wanhua Polyurethanes Co., Ltd., Ningbo (CN); Beijing University of Chemical Technology, Beijing (CN)

( * ) Notice: Subject to any disclaimer, the term of this patent is extended or adjusted under 35 U.S.C. 154(b) by 644 days.

(21) Appl. No.: 11/873,056

(22) Filed: Oct. 16, 2007

(65) Prior Publication Data

US 2008/0249261 A1 Oct. 9, 2008

(30) Foreign Application Priority Data

Apr. 6, 2007 (CN) .................... 2007 1 0090419

(51) Int. Cl.
*C07C 211/00* (2006.01)
(52) U.S. Cl. .................. 564/333; 564/332; 564/334; 564/331; 564/330; 560/347; 560/358; 560/359; 526/64; 528/310
(58) Field of Classification Search ......... 564/330–334; 560/347, 358, 359, 330, 332–334; 526/64
See application file for complete search history.

(56) References Cited

U.S. PATENT DOCUMENTS

| 3,260,751 A | | 7/1966 | Powers et al. | 260/570 |
| 3,478,099 A | * | 11/1969 | Fohlen et al. | 564/333 |
| 3,517,062 A | | 6/1970 | Powers | 260/570 |
| 4,744,956 A | * | 5/1988 | Yant et al. | 422/106 |
| 6,673,970 B1 | * | 1/2004 | Renbaum et al. | 564/333 |
| 6,720,455 B2 | | 4/2004 | Hagen et al. | 564/333 |

FOREIGN PATENT DOCUMENTS

| CN | 1062347 A | 7/1992 |
| CN | 1021546 C | 7/1993 |
| CN | 1036766 C | 12/1997 |
| CN | 1038578 C | 6/1998 |

OTHER PUBLICATIONS

Yang et al Characterization of micromixing efficiency in rotating packed beds by chemical methods, Chemical Eng Journal, 121(2006), 147-152.*
Chen, Jianfeng; *The High Gravity Technology and its Application—A New Generation of Reaction and Separation Technology*; Chemical Industry Press, Jan. 2003, pp. 1-3; w /summary.
Jianfeng Chen, et al., "*The high gravity technology and its application—a new generation of reaction and separation technology*", Chemical Industry Press, Jan. 2003.

* cited by examiner

*Primary Examiner*—Gregory Listvoyb
(74) *Attorney, Agent, or Firm*—Ohlandt, Greeley, Ruggiero & Perle, L.L.P.

(57) ABSTRACT

The present invention provides a method of preparing polymethylene-polyphenyl-polyamine (briefly referred to as polyamine, DAM), in which a high gravity rotating bed is used as the mixing reactor of formaldehyde and aniline hydrochloride, the mixing solution of aniline hydrochloride and circulation solution and the formaldehyde are fed into the high gravity rotating bed reactor proportionally to carry out mixing and condensation reaction under a condition of a very high gravity; the materials leaving the high gravity rotating bed reactor is introduced into a stirred vessel to proceed with the pre-condensation reaction and obtain a condensation solution; and the process steps of heating, molecular rearrangement, neutralization, water washing and purification, etc. are completed to obtain the refined DAM. With the method according to the present invention, the main by-products is obviously reduced in the condensation process, the phenomenon of deposit attaching to the inner walls of circulation pipes and heat exchanger and blockage are prevented in the condensation process, the impurity content is low in the refined DAM, and the subsequent product MDI has a lighter color, the product quality is stable and may be improved to a certain extent.

7 Claims, 1 Drawing Sheet

METHOD OF PREPARING POLYMETHYLENE-POLYPHENYL-POLYAMINE

CROSS-REFERENCE TO RELATED APPLICATIONS

This application is related to, and claims priority in, Chinese Patent Application No. 200710090419.0 filed on Apr. 6, 2007, the disclosure of which is incorporated in its entirety by reference herein.

TECHNICAL FIELD

The present invention relates to a method of preparing polymethylene-polyphenyl-polyamine, particularly to a method of preparing polymethylene-polyphenyl-polyamine using a high gravity rotating bed as the mixing reactor for the reaction of formaldehyde and aniline hydrochloride.

TECHNICAL BACKGROUND

MDI (a mixture of diphenylmethylene diisocyanate and polymethylene polyphenyl isocyanate) is one of the main raw materials in the polyurethane industry. The MDI reacts with polyether polyalcohol or polyester polyalcohol, in the presence of catalyst, foaming agent and the like, to produce various polyurethane polymer materials which are used widely in the fields of polyurethane rigid- and semi-rigid foams plastics, of polyurethane products by reaction injection molding- or reinforced reaction injection molding process, as well as in the fields of heat insulation materials, synthetic fibers (urethane elastic fiber), binders and elastomers, etc.

It is well-known in the polyurethane industry that a condensation reaction of aniline and formaldehyde is conducted in the presence of a hydrochloric acid catalyst to obtain firstly polymethylene-polyphenyl-polyamine, and a phosgenation reaction of polymethylene-polyphenyl-polyamine is then conducted to produce monomeric MDI and polymeric MDI.

The condensation reaction of aniline and formaldehyde in the presence of a hydrochloric acid catalyst for obtaining polymethylene-polyphenyl-polyamine is one of the key steps in the MDI production process. If the formaldehyde and aniline can not be mixed at the molecular level in a short time, it may result in local excess of formaldehyde, thus by-products and net-like high polymers will be produced and the quality of the targeted polyamine will be affected. In addition, since the reaction mixture has a high viscosity and the raw materials flow in a laminar pattern, the mixing effect deteriorates accordingly, usually being accompanied with local overheating. Therefore, the by-products increase and the product quality fluctuates; in the worst situation, the pipes may be blocked and the reaction apparatus has to be shut down. The mixed state of formaldehyde with other raw materials is the key factor of the whole condensation reaction, in order to disperse formaldehyde in the reaction system rapidly and uniformly and avoid local excess. Up to now, the mixing/reaction apparatuses used in the production process are the mixing pump, the jet mixer, the dynamic mixer or the static mixer, etc.

U.S. Pat. No. 6,720,455B2 describes two condensation reaction modes, one of which generally adopts a process of firstly reacting the aniline with hydrochloric acid to produce aniline hydrochloride, then mixing aniline hydrochloride and formaldehyde in a proper mixing mode and conducting a pre-condensation reaction by controlling the reaction temperature in between 30-80° C. and controlling the residence time of the reaction materials in the reactor, and subsequently raising the temperature of reaction materials to 100-160° C. by heating the condensation solution in a stepwise or continuous mode to conduct a molecular rearrangement reaction.

Another reaction mode adopts the process of firstly mixing the aniline and formaldehyde to make them react with each other by controlling the reaction temperature in between 60-85° C., then removing the water from the above reaction solution with phase separation or other process, such as rectification, and mixing the obtained intermediate products and hydrochloric acid catalyst with a proper mixing mode to conduct a condensation reaction by controlling the temperature at 30-80° C. After the reaction was completed, the temperature was controlled at 100-160° C. in a stepwise or continuous temperature rising mode to conduct a molecular rearrangement reaction. However, this prior patent does not disclose the specific mode or apparatus which was used to mix the raw materials.

U.S. Pat. No. 6,673,970B1 describes a condensation process which can decrease or reduce impurities in DAM which may have impact on the color of the final MDI products, that is to say, the more the impurities is contained in DAM, the darker the color of MDI products is. In the process, the first step is to form aniline hydrochloride, the second step is to sufficiently form an intermediate aminobenzylaniline by adding the reactant formaldehyde gradually for controlling the reaction process; the third step is, in the molecular rearrangement process, to add about 70%-80% of stoichiometric amount of base to partially neutralize the reaction mixture.

U.S. Pat. No. 3,517,062 presents a process flow of continuous polyamines preparation. Aniline and hydrochloric acid form a salt in a CSTR (Continuous Stirred-Tank Reactor), which is introduced into another CSTR in which formaldehyde is fed continuously and the condensation reaction is conducted, then the reaction mixture is introduced into a tubular reactor to conduct the molecular rearrangement reaction.

U.S. Pat. No. 3,260,751 describes a continuous condensation process, in which the proposed flow condition of fluid is Re=4500-100000 to ensure a turbulent fluid condition, so that the formation of high molecular polymer may be inhibited and thus the blocking of apparatus may be avoided. If the materials can not be mixed sufficiently, the ratios of compositions of the raw materials may vary with local positions, and the desired product can not be obtained with satisfaction. Therefore, this patent proposes a L-type mixing device which consists of two stainless steel tubes having diameter of ¼ inch. The aniline hydrochloride passes through the L-type device and is introduced tangentially into a formaldehyde feeding tube from the bottom of the L-type. The diameter of aperture is 1/32 inch and a jacket casing is provided outside the tube for cooling. If several nozzles are distributed on the tubular reactor to feed the materials in batch, a formation of turbulent flow can also be obtained.

The main objects of these methods all relate to reduce the contents of impurities in polymethylene polyphenyl polyamines, so as to improve their performance in use of the MDI products and, at the same time, to inhibit formation of substance having high molecular weight caused by non-uniform distribution of formaldehyde, and so as to avoid the deposition and blocking phenomenon on the inner walls of pipes and apparatus. However, it is impossible for these known methods to attain a fast and sufficient mixing of aniline and formaldehyde, especially when used in a large-scale continuous production process, the above-mentioned problems may well occur.

High gravity technology is a novel technique which strengthens the mass transfer, heat transfer and the micro-mixing processes using a much higher gravity (referred to as "high gravity") than the earth gravity, and which is carried out by producing a simulative high gravity condition on earth through rotation. This technique can greatly improve the conversion rate and selectivity in reactions, significantly reduce the volume of reactors, simplify the process and flow pattern, obtain high efficiency and low power consumption, and reduce the pollutants discharge. As indicated in some studies and analyses, under a high gravity condition, the molecular diffusion between molecules of different sizes and the inter-phase mass transfer processes are much faster than that in a normal gravity field. When gas-liquid, liquid-liquid or liquid-solid two-phases flow towards each other and come into contact in a porous medium under a high gravity which is hundreds or even a thousand times higher than the earth gravity, an enormous shear force breaks the liquid into liquid films, liquid threads and liquid droplets of nano-scale and thus generate enormous and quick-renewed phase interfaces, so that the inter-phase mass transfer rate is improved by 1-3 order of magnitude than that the conventional tower devices could offer, and the micro-mixing and mass transfer process is improved greatly. Such kind of high gravity rotating bed device has been disclosed in the prior art. On the above basis, studies on practical application of high gravity technology have gained some important progresses and its application has been extended from the physical process, such as separation and desorption, into chemical reaction processes. However, up to now there is no report concerning the application of high gravity technology in condensation reaction for preparing polymethylene polyphenyl polyamines.

SUMMARY OF THE INVENTION

The object of the present invention is to provide a method of preparing polymethylene polyphenyl polyamines, which has the advantages of simple and stable operation, low impurity content in DAM and stable product quality.

To attain the above object, the inventive method comprises the following steps:

a) mixing aniline with hydrochloric acid and conducting a reaction to produce aniline hydrochloride;

b) introducing the aniline hydrochloride stream into circulation pipes and mixing it with a circulation solution coming from condensation stirred vessel, cooling the obtained mixed solution in a heat exchanger;

c) introducing the cooled solution and formaldehyde solution into a high gravity rotating bed reactor, in which mixing them and conducting a pre-condensation reaction;

d) introducing the materials discharged from the high gravity rotating bed reactor into the condensation stirred vessel to proceed with pre-condensation reaction and molecular rearrangement reaction; introducing a part of the reaction mixture discharged from the condensation stirred vessel into the circulation pipes as circulation solution and discharging the other part as products.

Hereinafter, the method of continuously preparing polymethylene polyphenyl polyamines according to the present invention is further explained; however, the present invention is not limited thereto in any way.

In step a), aniline, as one of the reaction materials, is mixed firstly with catalyst hydrochloric acid. Aniline has weak alkalinity, and could conduct a neutralization reaction when mixing with hydrochloric acid. The reaction proceeds very fast and aniline hydrochloride is formed with a large amount of reaction heat evolved. The applicable mixing apparatus could be a mixing pump, a jet mixer, or a static mixer, etc. The reaction could be carried out in a tubular reactor or a stirred vessel reactor.

In a preferable embodiment, aniline, as reaction material, is mixed with hydrochloric acid, as catalyst, in a venturi jet and completes therein the neutralization reaction. In the method according to the present invention, the molar ratio of hydrochloric acid to aniline in step a) is 0.05:1-0.9:1, preferably 0.2:1-0.6:1, and more preferably 0.25:1-0.5:1. Hydrochloric acid at the industrial-grade purity could be used for this purpose and the percentage concentration by weight of hydrochloric acid is preferably in the range of 30.1%-31.4 wt %.

In step b), the stream of produced aniline hydrochloride is introduced into the liquid phase circulation loop by a higher pressure head, provided by a transfer pump, than the pressure inside the liquid phase circulation pipes, so as to merge with a circulation solution stream coming from the condensation stirred vessel. The Re value (Re=du$\rho$/$\mu$, in which d is the tube diameter, u is the flow velocity, $\rho$ is the density, and $\mu$ is the viscosity) is larger than 5000, preferably larger than 7000, and more preferably larger than 9000. The aniline hydrochloride stream and the circulation stream are mixed uniformly in the pipes for a time of about 5-12 sec, and then introduced into the heat exchanger rapidly to remove the reaction heat. Wherein, the mixed solution after cooling in step b) has a temperature of 15-60° C., preferably 20-50° C., more preferably 30-45° C.; the heat exchanger used could be a wing-plate heat exchanger, a tubular heat exchanger or any other suitable heat exchanger for the process.

In step c), the high gravity rotating bed reactor used is the most important mixing reaction apparatus in the method of preparing polymethylene polyphenyl polyamines according to the present invention; it could be, but is not limited to, the rotating packed bed type, zigzag type, helix channel type, rotor-stator type or ring disks type of high gravity rotating devices. In step c), the mixed solution after cooling and the formaldehyde solution could be introduced into the high gravity rotating bed reactor respectively, in proportion to each other, through their respective material distributors. When implementing the method according to the present invention, the rotating speed of the rotor in the high gravity rotating bed reactor is 100-3000 rpm, preferably 300-200 rpm, and most preferably 450-1500 rpm.

By reference, The detailed illustration about the characteristics of such high gravity rotating bed reactors could be found from the following technical literatures, such as, "The high gravity technology and its application—a new generation of reaction and separation technology", Jianfeng CHEN, et al, Chemical Industry Press, and the Chinese Patent Nos. 95107423.7, 92100093.6, 91109225.2 and 95105343.4. The relevant contents of these literatures are incorporated into the Description of the present application by reference.

In step c), the formaldehyde solution and the mixed solution of aniline hydrochloride with circulation solution are mixed rapidly in the high gravity rotating bed reactor, resulting in a pre-condensation reaction. Wherein, the formaldehyde solution used in step c) could be an industrial-grade formaldehyde solution which has a percentage concentration by weight in a preferable range of 36.8-37.2 wt %; the molar ratio of formaldehyde to aniline is 0.1:1-0.8:1, preferably 0.2:1-0.65:1, and more preferably 0.3:1-0.55:1; the reaction temperature is controlled within 20-70° C., preferably 30-65° C., and more preferably 30-50° C.; and the reaction time is 0.5-10 sec, and preferably 0.5-5 sec.

In step d), the pre-condensation reaction needs a comparatively short residence time, the average is 10-60 min, preferably 15-45 min, and particularly preferably 20-35 min. The reaction temperature for the continuous pre-condensation reaction in the condensation stirred vessel is 15-80° C., preferably 20-70° C., and more preferably 30-60° C.

Subsequently, the condensation solution is heated by a conventional method to conduct a molecular rearrangement reaction, finally form a solution of diphenyhnethylene diamine hydrochloride and polymethylene-polyphenyl-polyamine hydrochloride. The volume flow ratio of the part, which is referred to as circulation solution, to the other part, which is the product, is 3:1 to 50:1, preferably 5:1 to 30:1, and more preferably 8:1 to 20:1. Then, the resultant product is further treated by the processes of neutralization, water washing and polyamine purification, etc. to obtain the refined DAM.

To attain the object of the present invention, the reaction apparatus for implementing the above preparation method consists mainly of a condensation reaction vessel, a high gravity rotating bed reactor, a venturi jet, a liquid-phase circulation loop and a heat exchanger, etc. The key device is the high gravity rotating bed reactor.

Over the prior art, the inventive method has the advantages as follows:

The method according to the present invention reduces the impurities in DAM and avoids the deposition and blocking onto the tube wall and blockage of the tube pass of the heat exchanger mainly by strengthening the dispersion of formaldehyde in the reaction system, and the rapid and uniform dispersion of formaldehyde is achieved with a high gravity rotating bed reactor which is capable of mixing and dispersing the raw materials sufficiently and uniformly. To strengthen the mixing and condensation reaction process, the inventive method adopts a high gravity rotating bed reactor having a capability of enhancing the mass and heat transfer and micro-mixing process greatly, so as to attain the object of simplifying the previous synthesis process for polymethylene polyphenyl polyamines production.

Due to the high speed rotation of the rotor in the high gravity rotating bed reactor, a stable high gravity condition is formed resulting in high gravity being tens or hundreds times higher than the normal earth gravity. With high dispersion, high turbulence, strong mixing and quick interface renewal of the raw materials in the rotating reaction channel, the reaction components get into contact at great relative speed, bringing about a greatly strengthened mass and heat transfer and the micro-mixing process between/among the reactants. Therefore, when the two streams of material pass through a rotating packing layer, formaldehyde and aniline can achieve a micro-mixing at a molecular level in a very short time.

After the high gravity mixer is used in the pre-condensation reaction system, the impurities content in DAM (such as, N-methyl compounds, the same below) is still low when the temperature of pre-condensation vessel is controlled at about 50° C., normally being kept around 0.1% (a result from gas chromatography, the same below). While in the prior art reaction process using a jet mixer, the content of the impurities in DAM, such as N-methyl compounds, is about 0.15% at 35° C. This shows that the inventive method can obtain the DAM of high quality, even though being operated at a higher reaction temperature. With a higher reaction temperature, the whole pre-condensation reaction system could be operated with wider flexibility, and the consumption of circulation water for cooling is reduced, so that power cost is decreased.

The inventive method can guarantee the mixing magnitude as required by the reaction system, so as to attain rapid and uniform dispersion of the reactants with each other, thus the reactant ratio, i.e. the ratio of aniline/formaldehyde, may be higher. The high gravity mixing is advantageous for a production with a higher formaldehyde proportion, while according to the previous process, the product quality is bad and even blockage happens when a higher formaldehyde proportion is used. In the inventive method, when the ratio of aniline/formaldehyde is about 1:0.49, the impurities content in DAM is about 0.23%; while with the prior art reaction process using a jet mixer, when the ratio of aniline/formaldehyde is increased to about 1:0.49, the operation of reaction system is unstable and the tubes are likely to be blocked by solid impurities formed due to the non-uniform dispersion of formaldehyde. As a result, the operation is abnormal; moreover, the impurities content in DAM is high, up to about 0.42%.

By examining the inventive method and the prior art reaction process using a jet mixer and analyzing comparatively their pre-condensation solutions, it is found that, when the reaction temperature in the inventive method is controlled at 36-40° C., the content of 4,4'-MDA in the reaction solution is about 11-14% which is obviously higher than the content of 4,4'-MDA in the reaction solution (about 4-6%) in the prior art reaction process using a jet mixer. This indicates an obvious acceleration in the whole course of the condensation reaction, and the reaction process is strengthened.

The method according to the present invention can improve the reactor efficiency and shorten the residence time of materials in the condensation reaction vessel. Meanwhile, the condensation reaction process is obviously accelerated, the main by-products is obviously less formed in the condensation process, the viscosity of condensation solution is decreased, the phenomena of deposit attachment onto the inner walls of circulation pipes and of heat exchanger and blocking thereof are prevented in the condensation process, the impurity content is low in the refined DAM, and the subsequent product MDI has a lighter color, the product quality is stable and is improved to a certain extent.

EMBODIMENTS OF THE INVENTION

Figure 1:
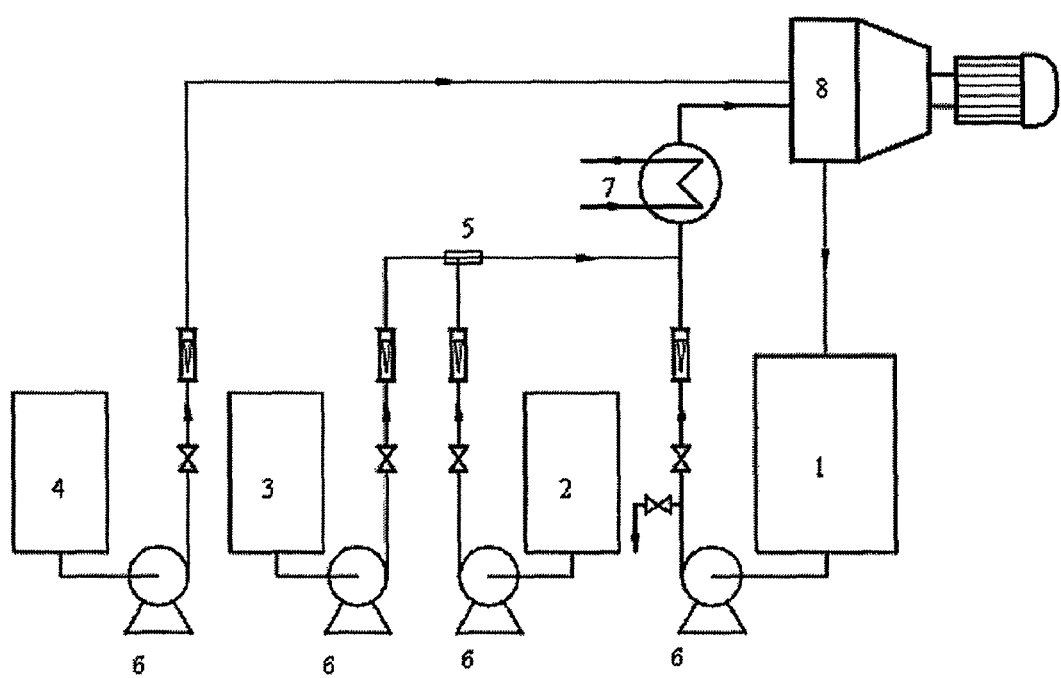
FIG. 1 is a process flow diagram of one embodiment of the present invention.

The embodiments of the invention will be further illustrated in the following with reference to the accompanying drawing and examples. However, the present invention is not limited to the following examples, but rather it should include any other known alteration or modification which falls within the scope of protection claimed by the invention.

The process flow diagram of one embodiment of the present invention is shown in FIG. 1. Hydrochloric acid from storage tank 2 and aniline from storage tank 3 in a certain molar ratio are fed into venturi mixer 5 by a pump 6, mixing and reacting with each other to produce aniline hydrochloride which is then pumped into circulation pipes and mixed with the circulation solution coming from a condensation stirred vessel 1 to obtain a mixed solution, the obtained mixed solution is introduced into a heat exchanger 7 to remove the reaction heat, and the circulation solution which has been cooled to a pre-determined temperature is introduced into a high gravity rotating bed reactor 8. Formaldehyde solution stream from storage tank 4 is fed through another feeding port of the high gravity rotating bed reactor 8, the ratio of formaldehyde to aniline is controlled within a certain range. The formaldehyde solution is mixed with the previously mixed solution and conducted a pre-condensation reaction in the high gravity rotating bed reactor 8, then the reaction solution flows rapidly into the condensation reaction vessel 1 to proceed with the pre-condensation reaction and molecular rearrangement reaction, Finally, a solution of diphenylmethylene diamine hydrochloride and polymethylene polyphenyl polyamines hydrochloride (referred as "reaction mixture" for short) is produced. A part of the reaction mixture out-flowed from the condensation stirred vessel is introduced into the circulation pipes as the circulation solution, the other part is discharged as products containing polymethylene polyphenyl polyamines. The ratio of the part, as circulation solution, to the part, as products containing polymethylene polyphenyl polyamines, is 3:1 to 50:1, preferably 5:1 to 30:1, and more preferably 8:1 to 20:1. Then the discharged products are neutralized with sodium hydroxide solution, the salt water phase is separated from the polyamine organic phase, and the polyamines are washed with water and purified to finally obtain a mixture of diphenylmethylene diamine and polymethylene polyphenyl polyamines.

The following examples are pilot-scaled experiments with a discharging amount of condensation solution of 800 kg per hour. The used high gravity rotating bed reactor of rotating packed bed type is designed and manufactured by the Research Center of the Ministry of Education for High Gravity Engineering and Technology, Beijing University of Chemical Technology.

EXAMPLE 1

Hydrochloric acid (a concentration percentage by weight is 30.8%, this hydrochloric acid is a by-product from MDI apparatus) from storage tank 2 and aniline from storage tank 3 are fed into venturi mixer 5 by a pump 6 with a molar ratio of hydrochloric acid/aniline=0.36:1, for mixing and reacting with each other to produce aniline hydrochloride which is then pumped into circulation pipes and mixed with a circulation solution coming from a condensation stirred vessel 1 to obtain a mixed solution. The obtained mixed solution is introduced into a heat exchanger 7 to remove the reaction heat, and the mixed solution, which is cooled to 38° C. and left the heat exchanger 7, is introduced into a feeding port of the high gravity rotating bed reactor 8 of rotating packed bed type. Formaldehyde solution (a concentration percentage by weight is 37 wt %) stream from storage tank 4 is fed through another feeding port of the high gravity rotating bed reactor 8, the ratio of formaldehyde to aniline is controlled at 0.40:1. The formaldehyde solution is mixed sufficiently with the previously mixed solution phase and conducted a pre-condensation reaction in the high gravity rotating bed reactor 8, the reaction temperature is controlled at 35° C., the reaction time is 0.5 sec, and the rotation speed of the rotor of high gravity rotating bed reactor is 1000 rpm. Then the mixed reaction solution flows into the condensation reaction vessel 1 to proceed with the pre-condensation reaction, the temperature of reaction solution is controlled at 42° C., the stirring speed is about 110 rpm, and the reaction residence time is about 20 min. Then the temperature of reaction solution is elevated to over 90° C. to conduct a molecular rearrangement reaction, the residence time for molecular rearrangement reaction is about 2 hours. Finally a solution of diphenylmethylene diamine hydrochloride and polymethylene polyphenyl polyamines hydrochloride is obtained. 92 vol % of the reaction mixture from the condensation reaction vessel 1 returns to the circulation pipes, as circulation solution, and flows to heat exchanger 7, the other 8 vol % of the reaction mixture is discharged and neutralized with a sodium hydroxide solution at a concentration of 42 wt %. The salt water phase is separated from the polyamine organic phase, and the polyamines are washed with water and purified to finally obtain a mixture of diphenylmethylene diamine and polymethylene polyphenyl polyamines. The composition of products is listed in table 2.

EXAMPLE 2

Hydrochloric acid (at a concentration of 30.8 wt %, this hydrochloric acid is a by-product of MDI apparatus) from storage tank 2 and aniline from storage tank 3 are fed into venturi mixer 5 by a pump 6 with a molar ratio of hydrochloric acid/aniline=0.36:1, for mixing and reacting with each other to produce aniline hydrochloride which is then pumped into circulation pipes and mixed with the circulation solution coming from a condensation stirred vessel 1 to obtain a mixed solution. The mixed solution is introduced into a heat exchanger 7 to remove the reaction heat, and is, after being cooled to 39° C., further introduced into a high gravity reactor 8 of rotating packed bed type. Formaldehyde solution (at a concentration of 37 wt %) stream from storage tank 4 is fed into through other feeding port of the high gravity rotating bed reactor 8, the ratio of formaldehyde to aniline is controlled at 0.46:1. The formaldehyde solution is mixed sufficiently with the previously mixed solution phase and conducted a pre-condensation reaction in the high gravity rotating bed reactor 8, the reaction temperature is controlled at 43° C., the reaction time is 0.8 sec, and the rotation speed of the rotor of high gravity rotating bed reactor is 1200 rpm. Then the mixed reaction solution flows into the condensation reaction vessel 1 to proceed with the condensation reaction, the temperature of reaction solution is controlled at 50° C., the stirring speed is about 110 rpm, and the reaction time is about 20 min. Then the temperature of reaction solution is elevated to over 90° C. to conduct a molecular rearrangement reaction, the residence time for molecular rearrangement reaction is about 2 hours. Finally a solution of diphenylmethylene diamine hydrochloride and polymethylene polyphenyl polyamines hydrochloride is obtained. 92 vol % of the reaction mixture from the condensation reaction vessel 1 returns to the circulation pipes, as circulation solution, and flows to the heat exchanger 7, the other 8 vol % of the reaction mixture is discharged and neutralized with a sodium hydroxide solution at a concentration of 42 wt %. The salt water phase is separated from the polyamine organic phase, and the polyamines are washed with water and purified to finally obtain a mixture of diphenylmethylene diamine and polymethylene polyphenyl polyamines. The composition of products is listed in table 2.

EXAMPLE 3

Hydrochloric acid (at a concentration of 30.8 wt %, this hydrochloric acid is a by-product of MDI apparatus) from storage tank 2 and aniline from storage tank 3 are fed into venturi mixer 5 by a pump 6 with a molar ratio of hydrochloric acid/aniline=0.38:1, for mixing and reacting with each other to produce aniline hydrochloride which is then pumped into circulation pipes and mixed with the circulation solution coming from a condensation stirred vessel 1 to obtain a mixed solution. The mixed solution is introduced into a heat exchanger 7 to remove the reaction heat, and is, after being cooled to 39° C., introduced into a high gravity reactor 8 of rotating packed bed type. Formaldehyde solution (at a concentration of 37 wt %) stream coming from storage tank 4 is fed into the high gravity rotating bed reactor 8 through other feeding port, the ratio of formaldehyde to aniline is controlled at 0.34:1. The formaldehyde solution is mixed sufficiently with the previously mixed solution phase and conducted a pre-condensation reaction in the high gravity rotating bed reactor 8, the reaction temperature is controlled at 32° C., the reaction time is 1.2 sec, and the rotation speed of the rotor of high gravity rotating bed reactor is 800 rpm. Then the mixed reaction solution flows into the condensation reaction vessel 1 to proceed with the condensation reaction, the temperature of reaction solution is controlled at 35° C., the stirring speed is about 110 rpm, and the reaction residence time is about 20 min. Then the temperature of reaction solution is elevated to over 90° C. to conduct a molecular rearrangement reaction, the residence time for molecular rearrangement reaction is about 2 hours. Finally a solution of diphenylmethylene diamine hydrochloride and polymethylene polyphenyl polyamines hydrochloride is obtained. 92 vol % of the reaction mixture from the condensation reaction vessel 1 returns to the circulation pipes, as circulation solution, and flows to the heat exchanger 7, the other 8 vol % of the reaction mixture is discharged and neutralized with a sodium hydroxide solution at a concentration of 42 wt %. The salt water phase is separated from the polyamine organic phase, and the polyamines are washed with water and purified to obtain a mixture of diphenylmethylene diamine and polymethylene polyphenyl polyamines finally. The composition of products is listed in table 2.

EXAMPLE 4

Hydrochloric acid (at a concentration of 30.8%, this hydrochloric acid is a by-product of MDI apparatus) from storage tank 2 and aniline from storage tank 3 are fed into venturi mixer 5 by a pump 6 with a molar ratio of hydrochloric acid/aniline=0.32:1, for mixing and reacting with each other to produce aniline hydrochloride which is then pumped into circulation pipes and mixed with the circulation solution coming from a condensation stirred vessel 1 to obtain a mixed solution. The mixed solution is introduced into a heat exchanger 7 to remove the reaction h eat, and is, after being cooled to 39° C., introduced into a high gravity reactor 8 of rotating packed bed type. Formaldehyde solution (at a concentration of 37 wt %) stream from storage tank 4 is fed into the high gravity rotating bed reactor 8 through other feeding port, the ratio of formaldehyde to aniline is controlled at 0.54:1. The formaldehyde solution is mixed sufficiently with the previously mixed solution phase and conducted a precondensation reaction in the high gravity rotating bed reactor 8, the reaction temperature is controlled at 44° C., the reaction time is 1 sec, and the rotation speed of the rotor of high gravity rotating bed reactor is 1800 rpm. Then the mixed reaction solution flows into the condensation reaction vessel 1 to proceed with the condensation reaction, the temperature of reaction solution is controlled at 56° C., the stirring speed is about 110 rpm, and the reaction residence time is about 20 min. Then the temperature of reaction solution is elevated to over 90° C. to conduct a molecular rearrangement reaction, the residence time for molecular rearrangement reaction is about 2 hours. Finally a solution of diphenylmethylene diamine hydrochloride and polymethylene polyphenyl polyamines hydrochloride is obtained. 92 vol % of the reaction mixture from the condensation reaction vessel 1 returns to the circulation pipes as circulation solution and flows to the heat exchanger 7, the other 8 vol % of the reaction mixture is discharged and neutralized with a sodium hydroxide solution at a concentration of 42 wt %. The salt water phase is separated from the polyamine organic phase, and the polyamines are washed with water and purified to finally obtain a mixture of diphenylmethylene diamine and polymethylene polyphenyl polyamines. The composition of products is listed in table 2.

EXAMPLE 5

Hydrochloric acid (at a concentration of 30.8 wt %, this hydrochloric acid is a by-product of MDI apparatus) from storage tank 2 and aniline from storage tank 3 are fed into venturi mixer 5 by a pump 6 with a molar ratio of hydrochloric acid/aniline=0.28:1, for mixing and reacting with each other to produce aniline hydrochloride which is then pumped into circulation pipes and mixed with the circulation solution coming from condensation stirred vessel 1 to obtain a mixed solution. The mixed solution is introduced into heat exchanger 7 to remove the reaction heat, and is, after being cooled to 39° C., introduced into high gravity reactor 8 of rotating packed bed type. Formaldehyde solution (at a concentration of 37 wt %) stream from storage tank 4 is fed into the high gravity rotating bed reactor 8 through other feeding port, the ratio of formaldehyde to aniline is controlled at 0.46:1. The formaldehyde solution is mixed sufficiently with the previously mixed solution phase and conducted a precondensation reaction in the high gravity rotating bed reactor 8, the reaction temperature is controlled at 40° C., the reaction time is 1.5 sec, and the rotation speed of the rotor of high gravity rotating bed reactor is 1400 rpm. Then the mixed reaction solution flows into the condensation reaction vessel 1 to proceed with the condensation reaction, the temperature of reaction solution is controlled at 55° C., the stirring speed is about 110 rpm, and the reaction time is about 20 min. Then the temperature of reaction solution is elevated to over 90° C. to conduct a molecular rearrangement reaction, the time for molecular rearrangement reaction is about 2 hours. Finally a solution of diphenylmethylene diamine hydrochloride and polymethylene polyphenyl polyamines hydrochloride is obtained. 92 vol % of the reaction mixture from the condensation reaction vessel 1 returns to the circulation pipes as circulation solution and flows to the heat exchanger 7, the other 8 vol % of the reaction mixture is discharged and neutralized with a sodium hydroxide solution at a concentration of 42 wt %. The salt water phase is separated from the polyamine organic phase, and the polyamines are washed with water and purified to finally obtain a mixture of diphenylmethylene diamine and polymethylene polyphenyl polyamines. The composition of products is listed in table 2.

Comparative Example 1

Hydrochloric acid (at a concentration of 30.8 wt %, this hydrochloric acid is a by-product of MDI apparatus) from storage tank 2 and aniline from storage tank 3 are fed into venturi mixer 5 by a pump 6 for mixing, the molar ratio of hydrochloric acid to aniline is controlled at 0.36:1. The aniline and hydrochloric acid are mixed in a salt-formation stirred vessel and reacted to produce aniline hydrochloride which is then pumped into circulation pipes and mixed with the circulation solution. The obtained mixed solution is introduced into a heat exchanger to remove the reaction heat, and the cooled mixed solution has a temperature of about 36° C. The mixed solution is introduced into a jet mixer through a feeding port. The ratio of formaldehyde to aniline is controlled at 0.40:1, and formaldehyde stream is fed through another feeding port. The formaldehyde is mixed rapidly with the previously mixed solution in the jet mixer, and the mixed reaction solution flows quickly into a condensation reaction vessel to proceed with the reaction, the reaction temperature is controlled at 39° C., the stirring speed is about 110 rpm, and the reaction time is about 40 min. After a temperature elevation stage, the reaction temperature is elevated to over 90° C. to conduct a molecular rearrangement reaction, the time for molecular rearrangement reaction is about 3 hours. Finally a solution of diphenylmethylene diamine hydrochloride and polymethylene polyphenyl polyamines hydrochloride is obtained. The reaction mixture is neutralized with a sodium hydroxide solution at a concentration of 42 wt %, and the salt water phase is separated from the polyamine organic phase. The polyamines are washed with water and purified to finally obtain a mixture of diphenylmethylene diamine and polymethylene polyphenyl polyamines.

TABLE 1

Performance comparison of examples

| Comparison items | Example 1 | Example 2 | Example 3 | Example 4 | Example 5 | Comparative example 1 |
| --- | --- | --- | --- | --- | --- | --- |
| Frequency of tube blocking | Seldom | Seldom | No | Seldom | Seldom | Frequently |
| Fluctuation extent of reaction temperature | Stable | Stable | Stable | Stable basically | Stable | Fluctuating obviously |
| Influence of change of circulation volume | Un-obvious | Un-obvious | No | Un-obvious | Un-obvious | Obvious |
| Cloud point of DAM | 5.1° C. | 11° C. | 4.2° C. | 14.4° C. | 10.3° C. | 6.3° C. |

TABLE 2

Comparison of DAM features (GC)

| | 2,2'-MDA (wt %) | 2,4'-MDA (wt %) | 4,4'-MDA (wt %) | MDA (wt %) | N-methyl compound (wt %) |
| --- | --- | --- | --- | --- | --- |
| Example 1 | 0.085 | 4.30 | 66.75 | 71.14 | 0.09 |
| Example 2 | 0.06 | 3.54 | 58.93 | 62.53 | 0.23 |
| Example 3 | 0.12 | 6.63 | 66.37 | 72.79 | 0.08 |
| Example 4 | 0.05 | 2.57 | 48.54 | 51.16 | 0.24 |
| Example 5 | 0.15 | 4.98 | 58.04 | 63.17 | 0.16 |
| Comparative example 1 | 0.10 | 4.53 | 66.30 | 70.93 | 0.23 |

What is claimed is:

1. A method of preparing polymethylene-polyphenyl-polyamine, comprising the following steps:
   a) mixing aniline with hydrochloric acid in a venturi jet mixer and conducting a reaction to produce aniline hydrochloride;
   b) introducing the aniline hydrochloride stream into circulation pipes and mixing with a circulation solution coming from a condensation stirred vessel, then cooling the obtained mixed solution with a heat exchanger;
   c) introducing the cooled mixed solution and formaldehyde solution into a high gravity rotating bed reactor for mixing and conducting a pre-condensation reaction;
   d) introducing the materials discharged from the high gravity rotating bed reactor into the condensation stirred vessel to proceed with pre-condensation reaction and molecular rearrangement reaction; introducing a part of the reaction mixture discharged from the condensation stirred vessel into the circulation pipes as circulation solution and discharging the other part as product, and wherein the volume flow ratio of the part as circulation solution to the part as product is 3:1-50:1.

2. The method according to claim 1, characterized in that, the high gravity rotating bed reactor used in step c) is selected from the high gravity rotating devices of rotating packed bed type, zigzag type, helix channel type, rotor-stator type or ring disks type.

3. The method according to claim 2, characterized in that, the rotating speed of the rotor in the high gravity rotating bed reactor used in step c) is 100-3000 rpm, the molar ratio of formaldehyde to aniline is 0.1:1-0.8:1, the temperature of reaction solution is controlled at 20-70° C., and the reaction time is 0.5-10 sec.

4. The method according to claim 3, characterized in that, in step a), the molar ratio of hydrochloric acid to aniline is 0.05:1-0.9:1; in step b), the mixed solution is cooled to 15-60° C., in step c), the rotating speed of the rotor in the high gravity rotating bed reactor is 300-2000 rpm; and in step d), the reaction temperature of pre-condensation reaction is 15-80° C., the average residence time is 10-60 min.

5. The method according to claim 4, characterized in that, in step a), the molar ratio of hydrochloric acid to aniline is 0.2:1-0.6:1; in step b), the mixed solution is cooled to 20-50° C., in step c), the molar ratio of formaldehyde to aniline is 0.2:1-0.65:1, the temperature of reaction solution is controlled at 30-65° C., the reaction time is 0.5-5 sec, and the rotating speed of the rotor in the high gravity rotating bed reactor is 450-1500 rpm; and in step d), the reaction temperature of pre-condensation reaction is 20-70° C., the average residence time is 15-45 min, and the volume flow ratio of the part as circulation solution to the part as product is 5:1-30:1.

6. The method according to claim 5, characterized in that, in step a), the molar ratio of hydrochloric acid to aniline is 0.25:1-0.5:1; in step b), the mixed solution is cooled to 30-45° C., in step c), the molar ratio of formaldehyde to aniline is 0.3:1-0.55:1, and the temperature of reaction solution is controlled at 30-50° C.; and in step d), the reaction temperature of pre-condensation reaction is 30-60° C., the average residence time is 20-35 min, and the volume flow ratio of the part as circulation solution to the part as products is 8:1-20:1.

7. The method according to claim 6, characterized in that the heat exchanger used in step b) is a wing-plate heat exchanger or a tubular heat exchanger.

* * * * *